Dec. 25, 1956  C. M. McCLURKIN  2,775,187
AIR CIRCULATING DOOR FOR REFRIGERATOR
Filed Feb. 18, 1954
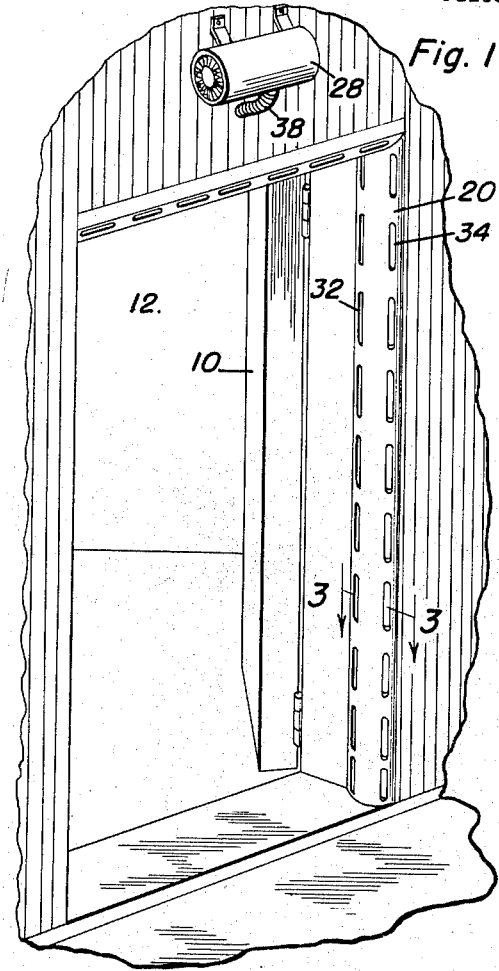
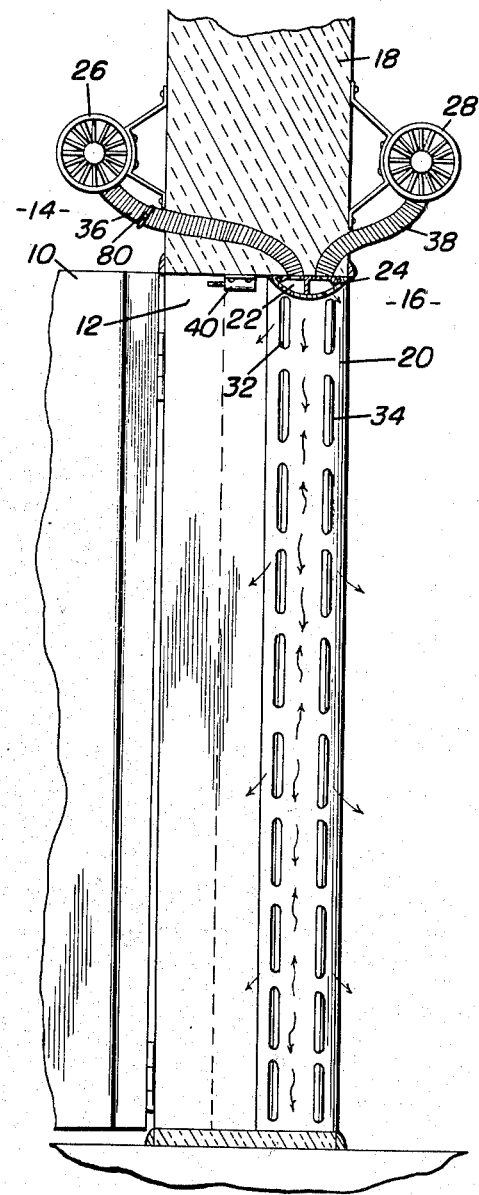
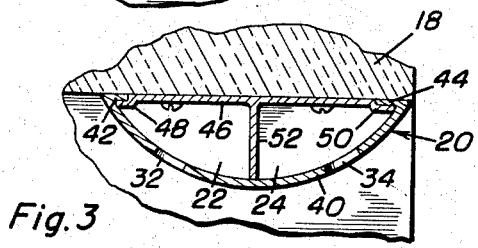
Fig. 3
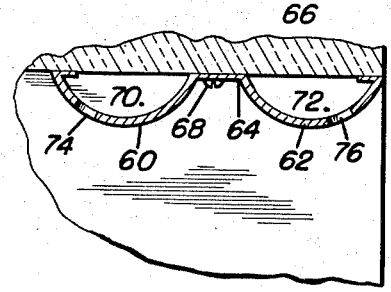
Fig. 4
Fig. 2
Cloise M. McClurkin
INVENTOR.
BY *Clarence A. O'Brien*
*and Harvey B. Jackson*
Attorneys

United States Patent Office 2,775,187
Patented Dec. 25, 1956

2,775,187

AIR CIRCULATING DOOR FOR REFRIGERATOR

Cloise M. McClurkin, Norfolk, Va.

Application February 18, 1954, Serial No. 411,080

1 Claim. (Cl. 98—36)

This invention relates to an air circulatory door for a refrigerator and particularly to a compound air screen to prevent transfer of temperature between two rooms of different temperatures with an opening therebetween.

When it is necessary to maintain communication such as an open door between two rooms of different temperature considerable difficulty has been encountered in preventing air flow between the two rooms and consequent mixing of the temperatures and migration of heat from one room to the other to substantially tend to equalize the temperatures in the adjacent rooms. Under conditions such as loading and unloading meat coolers, refrigerators and the like where it is necessary for workmen to continuously pass and repass in order to perform the operation great quantities of energy have been lost and considerable difficulty has been encountered in maintaining the desired temperature levels in various portions of the plant including the two adjacent rooms.

Heretofore, numerous attempts have been made to provide so-called air curtains across such apertures and air has been of relatively high velocity across the door to prevent the exchange of air between the two bodies of air in the adjacent rooms. However, it was found that such air curtains have entrained the air in the adjacent rooms so that the mixing of air in the curtain not only substantially defeats the purpose thereof but because of the entraining action frequently causes more damage than would be sustained by the unprotected opening.

The present invention has provided a circulatory air curtain for maintaining the difference in temperature levels between two adjacent rooms which comprises providing a pair of parallel air curtains with the air curtains closest to the different rooms being fed from the air in these rooms so that there is no difference in temperature between the air curtain and the adjacent body of air. Further, by providing a pair of parallel curtains a substantially dead air space is provided between the two bodies of air so that there is little or no tendency of mixing of the air between the two air curtains.

It is accordingly an object of the invention to provide a circulatory air door for use between bodies of air of different temperatures.

It is a further object of the invention to provide a circulatory air door utilizing air from the adjacent bodies of air to provide parallel air curtains.

It is a further object of the invention to provide a compound air curtain in which the air adjacent to the body of air is of substantially the same temperature.

Other objects and many of the attendant advantages of the present invention will be apparent from the following detailed description taken in conjunction with the accompanying drawing in which:

Figure 1 is a perspective view of a refrigerator door equipped with the air door according with the invention;

Figure 2 is a vertical elevation through the door in open position showing the manner of carrying air in alternate rooms into the air curtain;

Figure 3 is a cross-section through a preferred duct for producing the air curtain; and Figure 4 is a modified duct according to the invention.

In the exemplary embodiment according to the invention a door 10 is placed in an aperture 12 between two spaces 14 and 16 which are to be maintained at different temperatures, such as for example the space 16 may be a room at ordinary temperature wherein the space 14 may be a refrigerator or a room at higher temperature as may be desired. Obviously, the reverse could also be true. An insulating wall 18 is provided between the two compartments and the door 10 is usually of insulated material so that when the door 10 is closed there will be a very low rate of exchange of energy between the two spaces. When the door 10 must be opened a pair of parallel air curtains are provided in the aperture 12 by means of a duct 20 having a pair of air passages 22 and 24 therein with air being introduced into the passages 22 and 24 by means of fans 26 and 28 with the fans 26 and 28 being spaced in the different compartments, for example, the fan 26 being placed in the compartment 14 and being connected to the passage 22 adjacent to the compartment 14. Likewise the fan 28 is placed in the space 16 and is connected to the channel 24 of the duct 20. The channels 22 and 24 are provided with a pair of apertures 32 and 34 which extend substantially around the aperture 12 and at least over the sides and top thereof. The fan or blower 26 will be connected to the passage 22 by means of a conduit 36 and the fan or blower 28 will be connected to the channel 24 by means of the conduit 38. The fans or blowers 26 and 28 will be driven by suitable motors, not shown, which will be controlled by means of a switch 41 located in the aperture 12 so that when the door 10 is closed the switch 41 will be disconnected to disconnect the motors driving the fans 26 and 28.

It is to be noted that the blowers 26 and 28 are connected to the channels 22 and 24 on the respective sides of the door so that the air drawn by the fan or blower 26 will be drawn from the space 14 and delivered to the channel 22 to provide a curtain through the aperture 32 adjacent to the space 14 so that the curtain produced through the apertures 32 will be of the same temperature as the air in the space 14 in fact being air drawn from that space so that there will be no tendency to temperature transfer between the curtain and the adjacent layer of air in the space 14. Likewise the fan or blower 28 will draw air from the space 16 and deliver it to the channel 24 of the compound duct 20 so that the air curtain delivered through the apertures 34 will be of the same temperature as the adjacent air in the space 16. It is to be noted that the screens of air produced by the apertures 32 and 34 are substantially parallel to each other so that a relatively dead air space will be produced therebetween so that there will practically be no tendency for the two curtains to mix the air and the curtains themselves being the same temperature as the adjacent body of air will have little tendency to cause temperature transfer therein and any communication or entrainment of air in the adjacent space will be air of the same temperature so that no difference in temperature will be transmitted by the mixing.

While various types of ducts can obviously be used for this invention a suitable duct is illustrated at 20 in which a curved face plate 40 is provided with inturned flanges 44 and 42 which enclose a substantially flat back member 46 which has edges 48 and 50 overlying and interlapped with the flanges 42 and 44 to secure the back member 46 in assembled relation with the front member 40. The back member 46 is provided with an upstanding rib 52 which contacts the curved front member 40 providing the channels 22 and 24. The apertures 32 and 34 are provided in spaced relation in the channels 22 and 24 respectively so that air which surges through the apertures 32 and 34 will make a slightly diverging curtain so there will be substantially no mixing of the air from the two curtains and the curtains will provide a substantial dead air space therebetween.

Instead of providing a single front portion with a back portion and a divider it is sometimes desirable to provide a duct having two arcuate portions 60 and 62 separated by a substantially flat median portion 64 which may be secured to the insulating partition 66 by any suitable means such as the screw fastener 68. Respective curved portions 62 and 60 provide passages 70 and 72 which are in turn provided with apertures 74 and 76 to provide the parallel air curtains.

The operation of a door provided with the air duct structure it will be provided that when the door 10 is opened the switch 41 will energize the motors to drive the fans or blowers 26 and 28 so that air will be withdrawn from the respective compartments and discharged through the apertures 32 and 34 to provide parallel air curtains with the air of the curtains being withdrawn from the respective bodies of air and circulated thereagainst so that there will be no difference in air temperature between the curtain and the adjacent body of air. Because of the similar temperatures of the adjacent curtains and air masses there will be substantially no heat exchange because any air entrained in the curtain will have no tendency to change the temperatures thereof and the dead air space between the adjacent curtains will substantially prevent mixing of the material of the air curtains so that there will be little of any tendency of temperature transfer because of heat or energy interchanged between the adjacent masses of air.

Automatic dampers 80 will be placed in the conduit 36 in order to inhibit circulation of air between the air masses. A similar damper may be placed in the duct 38 if desired.

While for purposes of exemplification a particular embodiment of the invention has been shown and described according to the best present understanding thereof, it will be apparent to those skilled in the art that changes and modifications in the construction and arrangement of parts thereof may be readily resorted to without departing from the true spirit and scope of the invention.

What is claimed as new is as follows:

A temperature barrier for use in an opening between two spaces at different temperatures comprising a compound member forming a pair of air ducts of equal size arranged about the periphery of said opening, said compound member including a curved front wall, a substantially straight back wall, an upstanding rib on said back wall, said rib extending into contact with said front wall and dividing said compound member into said pair of ducts, longitudinal extending rows of perforations in said pair of ducts in said curved front wall thereof with said perforations in one of said pair of ducts extending angularly with respect to the perforations in the other of said pair of ducts to form a pair of series of diverging nozzles, air pumps in said spaces, each of said pumps delivering air to the duct adjacent to the space containing the respective pump from the space in which the pump is contained whereby a pair of slightly diverging air curtains of differing temperatures will be formed across said opening, said curtains diverging to substantially eliminate mixing of the air of the curtains.

References Cited in the file of this patent

UNITED STATES PATENTS

| | | |
|---|---|---|
| 983,877 | Cummings | Feb. 14, 1911 |
| 1,113,179 | Anderson | Oct. 13, 1914 |
| 2,367,276 | Hanson | Jan. 16, 1945 |
| 2,593,702 | Schneible | Apr. 22, 1952 |

FOREIGN PATENTS

| | | |
|---|---|---|
| 778,807 | France | Jan. 2, 1935 |
| 882,307 | France | Feb. 22, 1943 |